US010229379B2

(12) United States Patent
Visnovec et al.

(10) Patent No.: US 10,229,379 B2
(45) Date of Patent: Mar. 12, 2019

(54) CHECKLIST FUNCTION INTEGRATED WITH PROCESS FLOW MODEL

(71) Applicants: Tomas Visnovec, Bratislava (SK); Jakub Salamon, Bratislava (SK); Martin Slavik, Bratislava (SK); Martin Duffek, Bratislava (SK); Peter Dominik, Bratislava (SK); Matus Horvath, Bratislava (SK)

(72) Inventors: Tomas Visnovec, Bratislava (SK); Jakub Salamon, Bratislava (SK); Martin Slavik, Bratislava (SK); Martin Duffek, Bratislava (SK); Peter Dominik, Bratislava (SK); Matus Horvath, Bratislava (SK)

(73) Assignee: SAP SE, Walldorf (DE)

( * ) Notice: Subject to any disclaimer, the term of this patent is extended or adjusted under 35 U.S.C. 154(b) by 599 days.

(21) Appl. No.: 14/691,047

(22) Filed: Apr. 20, 2015

(65) Prior Publication Data
US 2016/0307125 A1 Oct. 20, 2016

(51) Int. Cl.
*G06Q 10/00* (2012.01)
*G06F 17/30* (2006.01)
(Continued)

(52) U.S. Cl.
CPC ..... *G06Q 10/067* (2013.01); *G06F 17/30294* (2013.01); *G06F 17/30297* (2013.01);
(Continued)

(58) Field of Classification Search
CPC ........ G06F 17/30569; G06F 17/30398; G06F 8/34–8/35; G06F 17/30604;
(Continued)

(56) References Cited

U.S. PATENT DOCUMENTS

| 5,537,526 A * | 7/1996 | Anderson | G06F 17/30014 |
|---|---|---|---|
| | | | 707/E17.013 |
| 6,643,613 B2 * | 11/2003 | McGee | G06F 11/0709 |
| | | | 700/51 |

(Continued)

FOREIGN PATENT DOCUMENTS

WO   WO 2009/033425   *   3/2009

OTHER PUBLICATIONS

Shaheen Khatoon et al., "Methodology for mapping business process into execution language",International Journal of engg science and tech, vol. 3, No. 1, Jan. 2001, pp. 696-704.*

(Continued)

*Primary Examiner* — Srirama Channavajjala
(74) *Attorney, Agent, or Firm* — Fountainhead Law Group P.C.

(57) ABSTRACT

Embodiments provide a checklist function integrated with a process flow model. The process checklist utilizes a semi-automated visual approach to cover processes specific to a user and/or enterprise. A model of the process is generated and stored, for example utilizing an input template in XML format and according to the Business Process Model and Notation (BPMN) standard. Next, instances corresponding to runs of the mapped processes are created. Various internal documents can be linked together within a process instance, thereby allowing enterprises to define different relationships between documents independent of product-wide implementation and database complexity. In some embodiments the process models may be accessed interactively in a What-You-See-Is-What-You-Get manner, without being machine executed. This allows for relatively loose process definition/modelling, fostering interpretation reliant upon user intuition. Certain embodiments may automatically suggest documents related to a particular step in a particular (Continued)

instance, and/or provide metric(s) indicating a degree of project completion.

17 Claims, 12 Drawing Sheets

(51) Int. Cl.
*G06Q 10/06* (2012.01)
*G06Q 10/10* (2012.01)

(52) U.S. Cl.
CPC .. *G06F 17/30587* (2013.01); *G06F 17/30604* (2013.01); *G06Q 10/0631* (2013.01); *G06Q 10/0633* (2013.01); *G06Q 10/10* (2013.01)

(58) Field of Classification Search
CPC ......... G06F 17/30294; G06F 17/30297; G06F 17/30587; G06Q 10/067; G06Q 10/0631; G06Q 10/103; G06Q 10/0633; G06Q 30/02; G06Q 30/2264; G06Q 10/10
See application file for complete search history.

(56) References Cited

U.S. PATENT DOCUMENTS

| | | | |
|---|---|---|---|
| 7,890,473 B1* | 2/2011 | Wyett | G06F 11/3409 707/687 |
| 8,606,623 B1* | 12/2013 | Bittinger | G06Q 10/0639 705/7.39 |
| 9,020,944 B2* | 4/2015 | Srivastava | G06F 17/30598 707/602 |
| 2003/0236693 A1 | 12/2003 | Chen et al. | |
| 2004/0031015 A1* | 2/2004 | Ben-Romdhane | G06F 8/75 717/107 |
| 2004/0088325 A1* | 5/2004 | Elder | G06Q 10/10 |
| 2005/0010933 A1* | 1/2005 | Vaught | G06F 17/30 719/328 |
| 2005/0187899 A1* | 8/2005 | Odagiri | G06F 17/227 |
| 2005/0203764 A1* | 9/2005 | Sundararajan | G06F 8/34 717/105 |
| 2006/0095562 A1* | 5/2006 | Agarwal | G06F 9/546 709/224 |
| 2006/0229926 A1* | 10/2006 | Homann | G06Q 10/0637 705/7.36 |
| 2006/0293941 A1* | 12/2006 | Ivanov | G06Q 10/10 715/835 |
| 2007/0005618 A1* | 1/2007 | Ivanov | G06Q 30/00 |
| 2007/0263550 A1* | 11/2007 | Perng | H04L 41/5003 370/252 |
| 2008/0004827 A1* | 1/2008 | Grigoriu | G06Q 10/10 702/108 |
| 2008/0312992 A1 | 12/2008 | Hoshi et al. | |
| 2009/0265684 A1* | 10/2009 | Fuchs | G06F 8/10 717/105 |
| 2009/0281865 A1 | 11/2009 | Stoitsev | |
| 2010/0057482 A1* | 3/2010 | Radhakrishnan | G06Q 10/06 717/104 |
| 2010/0088251 A1 | 4/2010 | Aggarwal et al. | |
| 2010/0162208 A1* | 6/2010 | Amid | G06F 8/37 717/107 |
| 2010/0179847 A1* | 7/2010 | Cope | G06Q 10/06311 705/7.28 |
| 2010/0325605 A1 | 12/2010 | Ding et al. | |
| 2011/0119651 A1 | 5/2011 | Utschig-Utschig et al. | |
| 2011/0219043 A1* | 9/2011 | Vaught | G06F 17/30 707/803 |
| 2012/0005116 A1 | 1/2012 | Das et al. | |
| 2012/0123994 A1* | 5/2012 | Lowry | G06Q 40/00 706/52 |
| 2013/0006698 A1* | 1/2013 | Roy | G06Q 10/06 705/7.27 |
| 2013/0091488 A1 | 4/2013 | Koutyrine et al. | |
| 2013/0117064 A1 | 5/2013 | Sadeghi et al. | |
| 2013/0138473 A1 | 5/2013 | Balko et al. | |
| 2013/0232464 A1* | 9/2013 | Jacquin | G06Q 10/06 717/104 |
| 2013/0238384 A1 | 9/2013 | Caesar et al. | |
| 2013/0282746 A1 | 10/2013 | Balko et al. | |
| 2013/0297528 A1 | 11/2013 | Stiehl | |
| 2014/0067448 A1 | 3/2014 | Joshi et al. | |
| 2014/0282366 A1* | 9/2014 | Barletta | G06F 8/41 717/105 |
| 2014/0344781 A1* | 11/2014 | Andres | G06F 9/45508 717/115 |

OTHER PUBLICATIONS

Publication entitled Business Process Model and Notation (BPMN), Version 2.0, OMG Document No. formal/2011-01-03, Dated Jan. 2011, pp. 1-538.

Declaration of Tomas Visnovec, signed on Apr. 17, 2015, together with Exhibit referenced in the Declaration.

* cited by examiner

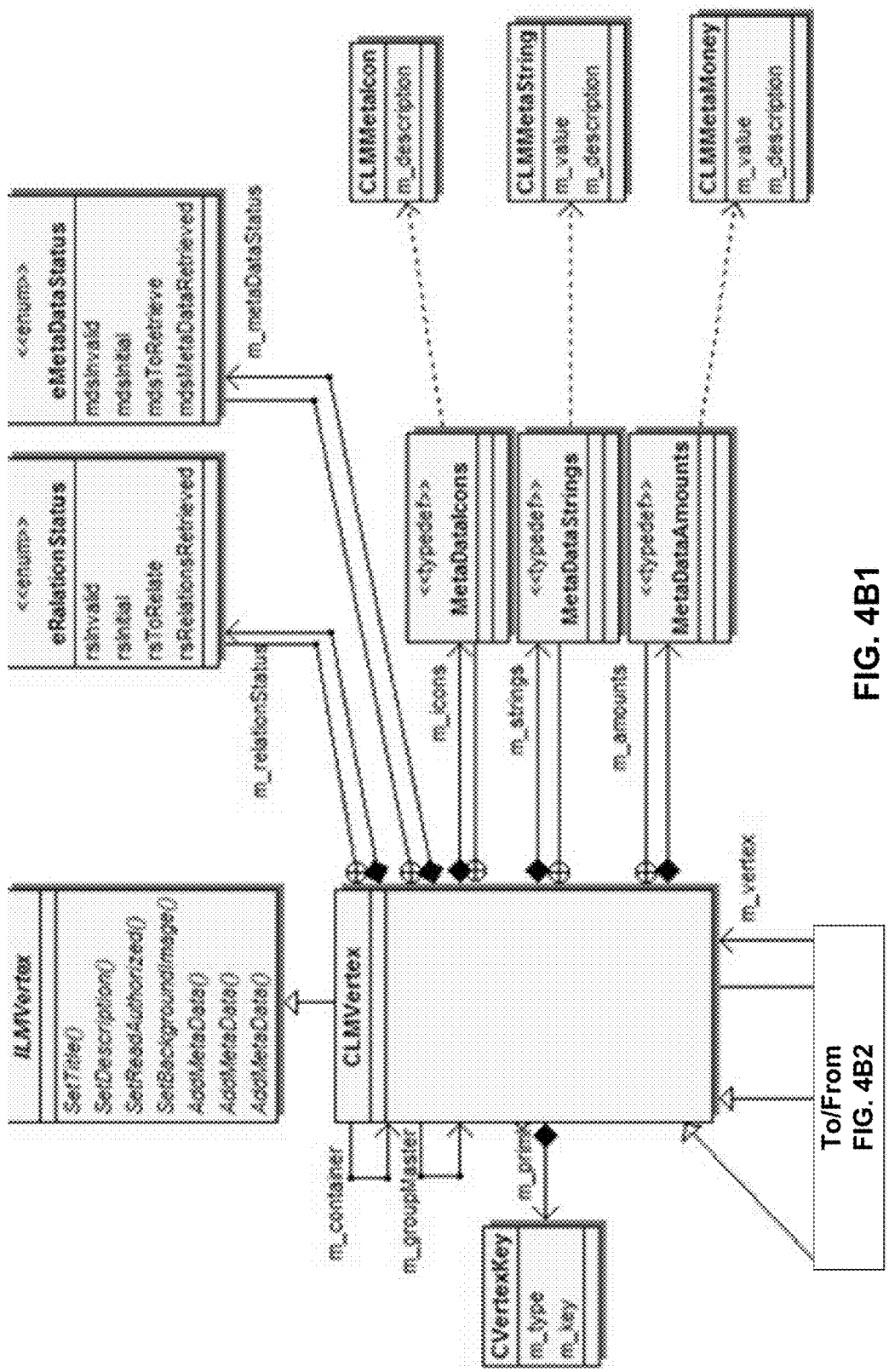
FIG. 4B1

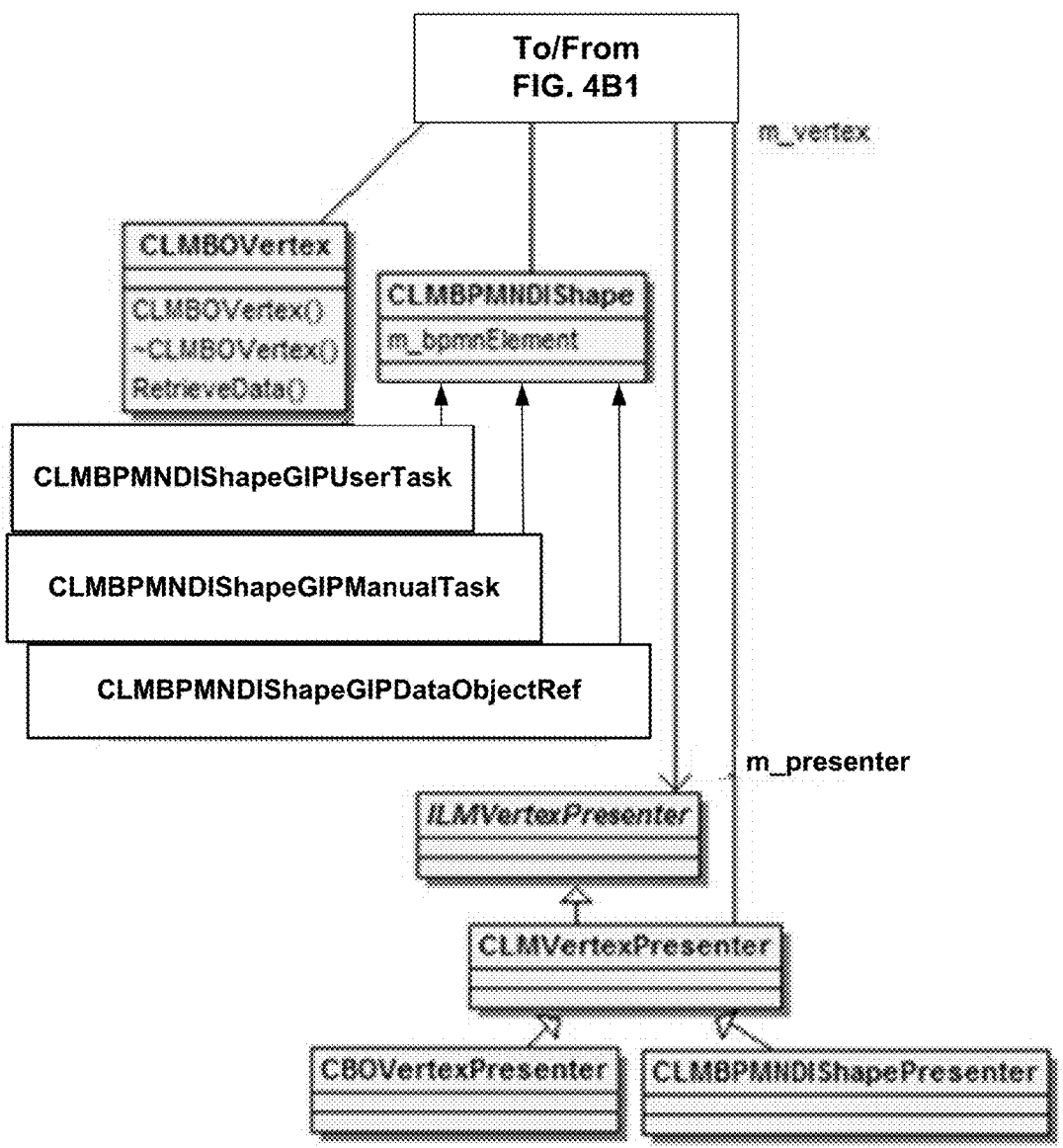
FIG. 4B2

CHECKLIST FUNCTION INTEGRATED WITH PROCESS FLOW MODEL

BACKGROUND

Unless otherwise indicated herein, the approaches described in this section are not prior art to the claims in this application and are not admitted to be prior art by inclusion in this section.

Embodiments relate to modeling business processes, and in particular to a user interface integrating a checklist function with a process flow model.

Increasingly, entities rely upon software programs to manage business processes. For example, Enterprise Resource Planning (ERP) software can track the progress of different teams of users in completing complex tasks over long periods.

To offer value to a variety of potential users (both large and small), business management software seeks to provide transparent relationships among documents, transactions, and master data. However, business processes may vary widely across different business entities, between different business models, across particular industries, and according to the customs of particular geographical locales. Even within a given entity, internal business divisions and product lines may dictate different process flows.

Consequently, ERP software trying to map such business processes has had to balance different competing design objectives. One objective is to accommodate implementation complexity, such that a wide variety of business processes are covered.

Another objective is to provide simplicity of access to a wide variety of potential users. In particular, non-expert users seeking to follow the business processes of their companies may face challenges in obtaining a clear overview of process status, and gaining an end-to-end understanding of the business process as a whole.

SUMMARY

Embodiments comprise methods and apparatuses providing a checklist function integrated with a process flow model. The process checklist utilizes a semi-automated visual approach to cover processes specific to a user and/or enterprise. A model of the process is generated and stored, for example utilizing an input template in XML format and according to the Business Process Model and Notation (BPMN) standard. Next, instances corresponding to runs of the mapped processes are created. Various internal documents can be linked together within a process instance, thereby allowing enterprises to define different relationships between documents independent of product-wide implementation and database complexity. In some embodiments the process models may be accessed interactively in a What-You-See-Is-What-You-Get manner, without being machine executed. This allows for relatively loose process definition/modelling, fostering interpretation reliant upon user intuition. Certain embodiments may automatically suggest documents related to a particular step, and/or provide metric(s) indicating a degree of project completion.

An embodiment of a computer-implemented method comprises an engine generating from a process flow model, a first process flow step linked to a first document stored in a database. The engine generates from the process flow model, a second process flow step linked to a second document stored in the database. The engine displays a process flow checklist including the first process flow step and the second process flow step. The engine displays the first document in response to a first input to the process flow checklist. The engine updates the process flow checklist in response to an input indicating completion of the first process flow step.

A non-transitory computer readable storage medium embodies a computer program for performing a method comprising an engine generating from a process flow model, a first process flow step linked to a first document stored in a database. The method further comprises the engine generating from the process flow model, a second process flow step linked to a second document stored in the database. The engine displays a process flow checklist including the first process flow step and the second process flow step. The engine displays the first document in response to a first input to the process flow checklist. The engine suggests a second document relevant to the first process flow step. The engine updates the process flow checklist in response to an input indicating completion of the first process flow step.

An embodiment of a computer system comprises one or more processors and a software program executable on said computer system. The software program is configured to cause an engine to generate from a process flow model, a first process flow step linked to a first document stored in a database. The software program is further configured to cause the engine to generate from the process flow model, a second process flow step linked to a second document stored in the database. The software program is further configured to cause the engine to display a process flow checklist including the first process flow step and the second process flow step. The software program is further configured to cause the engine to display the first document in response to a first input to the process flow checklist. The software program is further configured to cause the engine to update the process flow checklist in response to an input indicating completion of the first process flow step, and to generate a percentage of completion metric.

Certain embodiments further comprise the engine creating the process flow model from an input template.

In some embodiments the process flow model is created according to the Business Process Model Notation (BPMN) 2.0 standard.

Particular embodiments further comprise the engine communicating a process report to other than a user.

Various embodiments further comprise the engine suggesting a second document relevant to the first step.

Certain embodiments further comprise the engine displaying a percentage of completion metric.

In some embodiments the percentage of completion metric is selected from Completed Count (CC), Shortest Path to Finish (SPF), or Longest Completed Sequence (LCS).

In certain embodiments the process flow model further includes a constraint.

Various embodiments further comprise the engine assigning an owner to the process flow checklist.

The following detailed description and accompanying drawings provide a better understanding of the nature and advantages of embodiments.

DETAILED DESCRIPTION

Described herein are systems and methods providing a checklist function integrated into a process flow model. In the following description, for purposes of explanation, numerous examples and specific details are set forth in order to provide a thorough understanding of various embodiments. It will be evident, however, to one skilled in the art that embodiments of the present invention as defined by the claims may include some or all of the features in these examples alone or in combination with other features described below, and may further include modifications and equivalents of the features and concepts described herein.

Embodiments comprise methods and apparatuses providing a checklist function integrated with a process flow model. The process checklist utilizes a semi-automated visual approach to cover processes specific to a user and/or enterprise. A model of the process is generated and stored, for example utilizing an input template in XML format and according to the Business Process Model and Notation (BPMN) standard. Next, instances corresponding to runs of the mapped processes are created. Various internal documents can be linked together within a process instance, thereby allowing enterprises to define different relationships between documents independent of product-wide implementation and database complexity. In some embodiments the process models may be accessed interactively in a What-You-See-Is-What-You-Get manner, without being machine executed. This allows for relatively loose process definition/modelling, fostering interpretation reliant upon user intuition. Certain embodiments may automatically suggest documents related to a particular instance, and/or provide metric(s) indicating a degree of project completion.

Figure 1:
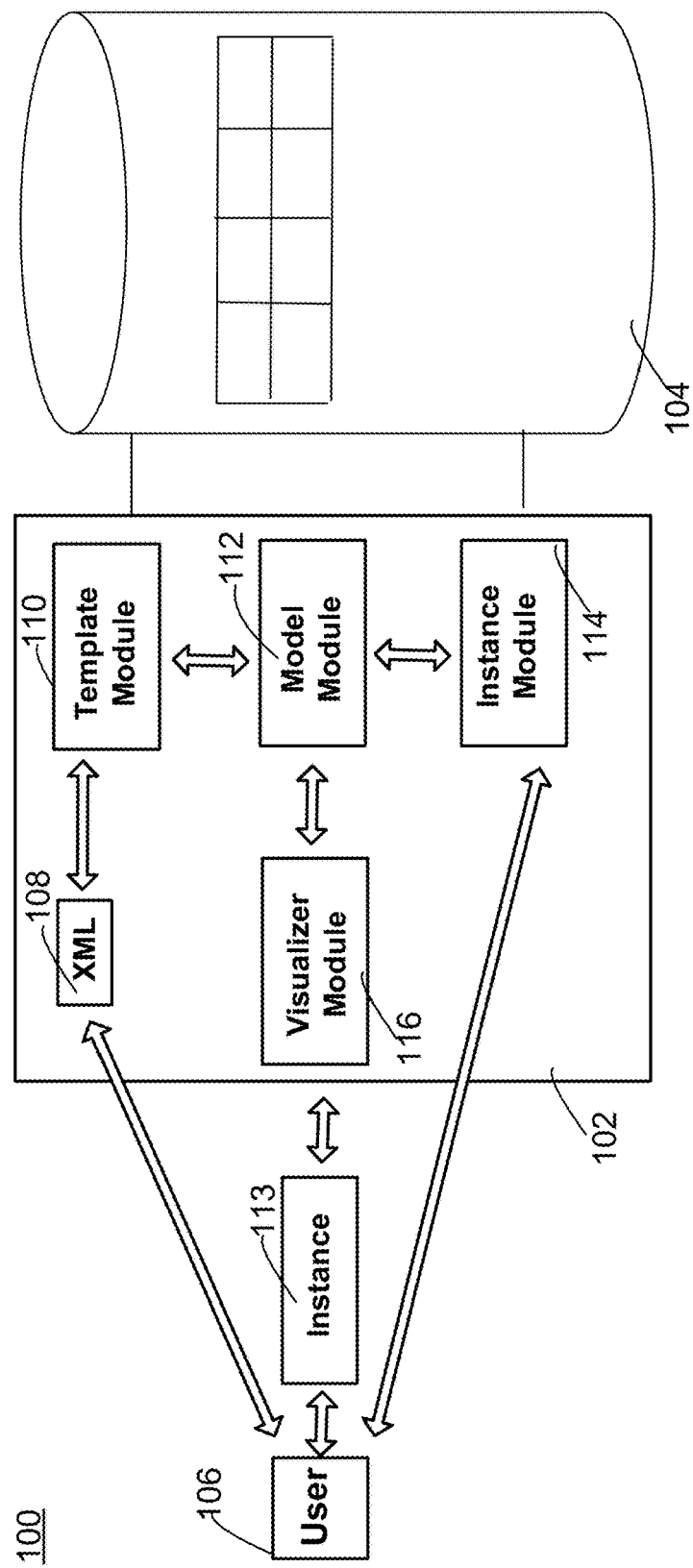
FIG. 1 is a simplified view of an embodiment of a system configured to provide a checklist function integrated with a process flow model.

FIG. 1 shows a simplified view of a system 100 according to an embodiment, that is configured to provide a checklist function integrated into a process flow model. In particular, engine 102 is in communication with an underlying database 104.

User interaction with database via the engine, proceeds as follows. A user 106 having knowledge of process flow modeling, creates a template file 108 in the form of a text file (e.g., XML). One example of a standard for modeling process flows, is the Business Process Model and Notation (BPMN) standard.

The template file is loaded and stored into the database, via the template module 110. Contents of the template file are then parsed by the BPMN model module 112, and the BPMN model is validated.

The user creates a new process checklist instance 113 via the instance module 114. That instance module subsequently uses the model module to create the model in memory.

The instance module uses the visualizer module 116 to provide an interactive Graphic User Interface (GUI) allowing the user to read and modify state of the model. That is, the user is allowed to follow and record a given modeled process. The instance module handles loading and storing the user modifications into the database.

In the simplified view of FIG. 1 a single user is depicted as both creating the model for the process flow checklist, and then interacting with same. This is not required, however. In some embodiments a first user having specialized knowledge of modeling methodology may create the model. Then, a different, ordinary user may subsequently access the process flow checklist instances and underlying documents in an interactive manner.

Figure 1A:
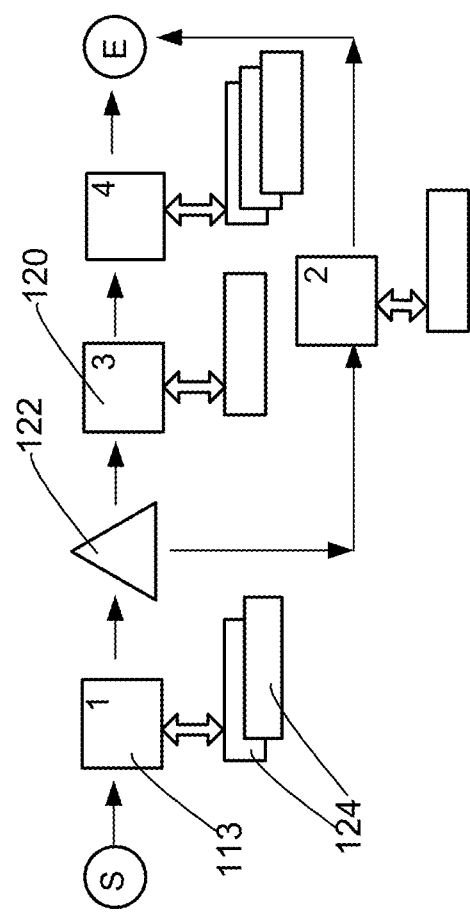
FIG. 1A shows a simplified view of a process instance—an interactive process flow diagram comprising a plurality of steps linked to documents.

FIG. 1A shows details of a process flow checklist 115 comprising a plurality of steps 113 according to an embodiment. The process flow is based upon a model (e.g., created according to the BPMN standard).

The instances comprise steps 120 of the process flow, commencing at a starting point S and terminating in an end point E. The process flow may further comprise decision points 122 leading to steps that are part of alternative branches.

Each step is linked to one or more relevant documents 124 including data stored in an underlying database. A user may thus access and edit the documents by interacting with the process flow checklist, returning to the checklist to move to other steps and documents relevant thereto.

Figure 1B:
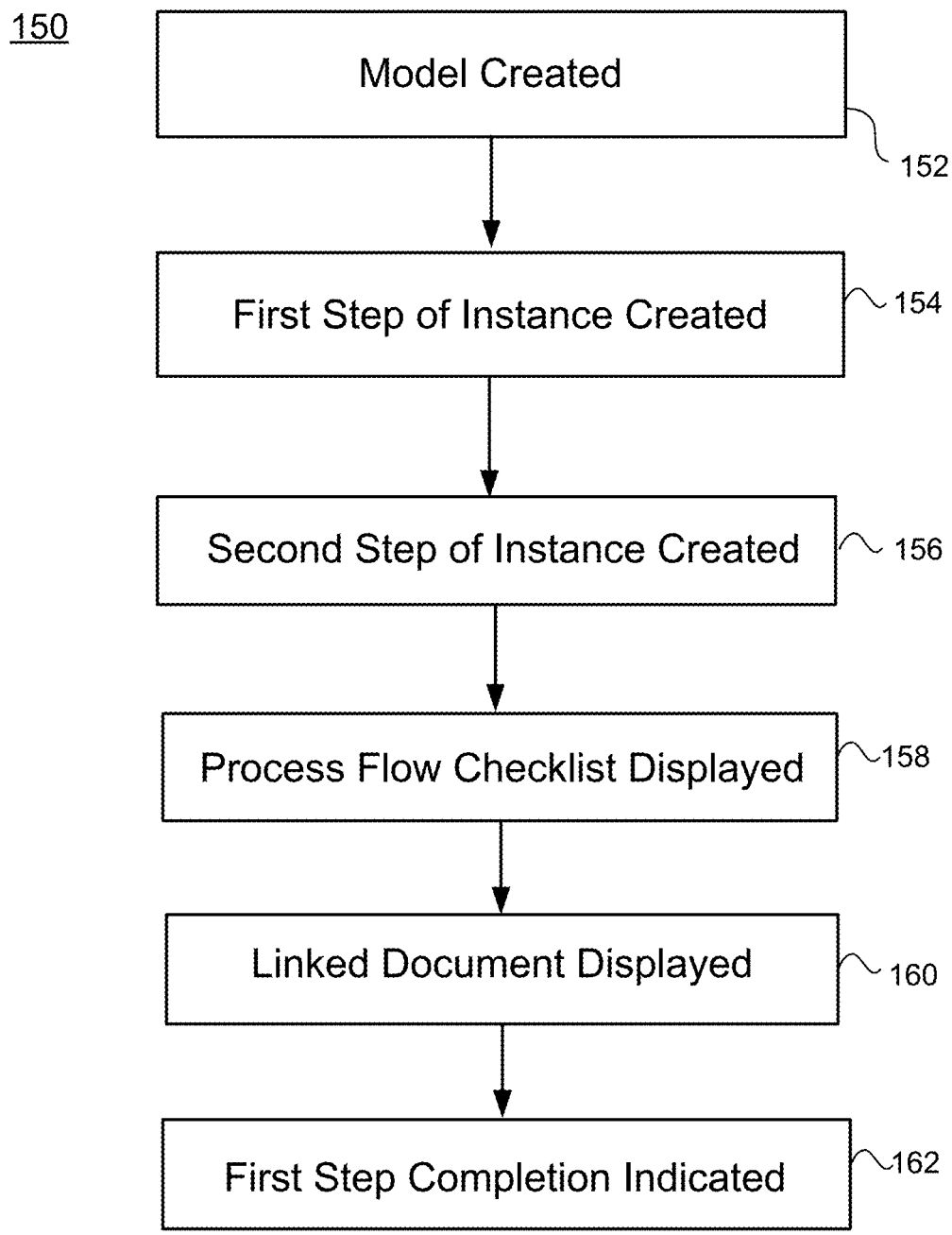
FIG. 1B is a simplified flow diagram of a process flow according to an embodiment.

FIG. 1B is a simplified view showing the steps of a method 150 of modeling and visualization of a process flow according to an embodiment. Reference number 152 shows an engine creating a process flow model based upon a template.

Reference number 154 shows the engine generating from the model, an instance having a first step created and linked to a document including database data.

Reference number 156 shows the engine generating from the model, the instance having a second step created and linked to another document including database data.

In a fourth step 158, the engine displays a process flow checklist including the first step and the second step.

In a fifth step 160, the engine displays the document in response to a first user input to the process flow checklist.

In a sixth step 162, the engine displays a completion of the first process flow step in response to a second user input to the process flow checklist.

Further details regarding the Process Checklist (PC) functionality are now described in connection with a number of specific examples.

Example—Goods Importation

Figure 2:
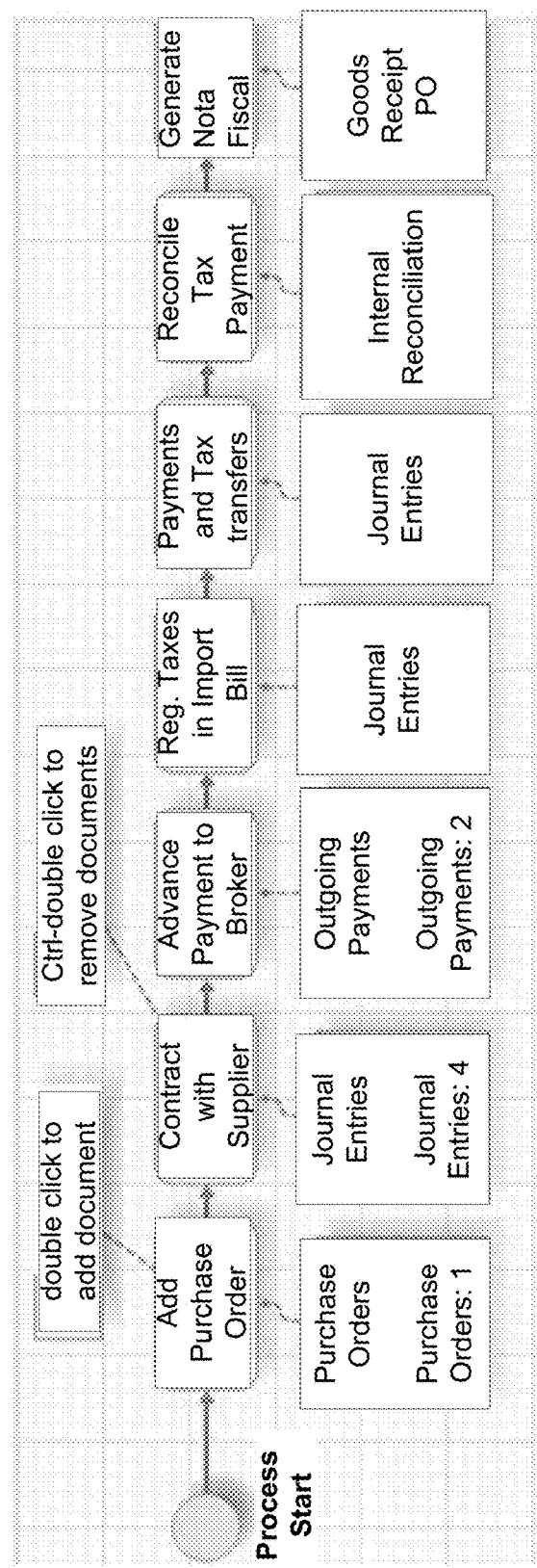
FIG. 2 shows an example of process modeling and visualization in connection with an importation of goods scenario.

FIG. 2 shows an example of process modeling and visualization in connection with an importation of goods scenario. In particular, process checklist functionality according to an embodiment is designed to help an employee user to navigate through the business process under his/her responsibility.

This business process checklist include a number of steps associated with importation, e.g., contracting with a supplier, payments and tax transfers. The business process checklist also offers links to the documents relevant to each step (e.g., accounting journal entries). In this manner, embodiments provide the employee with an intuitive mechanism to access relevant documents while affording an overview of the business process as a whole.

Some of the document boxes represent underlying data structures (e.g., business objects) that are relevant to the process. It is possible to combine various such underlying data structures, e.g., Purchase Order-Journal Entry-Payment.

The user may work with data structures represented by document boxes. For example, the user may double-click to assign documents from the available list, or to create new document(s). Inputting CTRL-Double-click may remove assigned documents.

A list of documents may be displayed under (or over) each box. By double-clicking on a document number, that document may be opened in standard form. As described later below, in certain embodiments a list of documents relevant to the process instance may be suggested to a user by the interface.

A user can store or update the new status of the process instance, and set and view additional data. One type of additional data is an instance name specifying, e.g., type of imported goods and description.

Another possible type of additional data is the identity of the creator. This may be automatically filed by the user who started the process.

Still another type of available information is the status of the process. Additional information can include dates, e.g., starting/closing of the process.

Also, as described later below, a closing percentage may display the progress of the process. Further information may include remarks (notes related to specific process), and/or attachments (documents related to specific process).

Example—Sales

Figure 3:
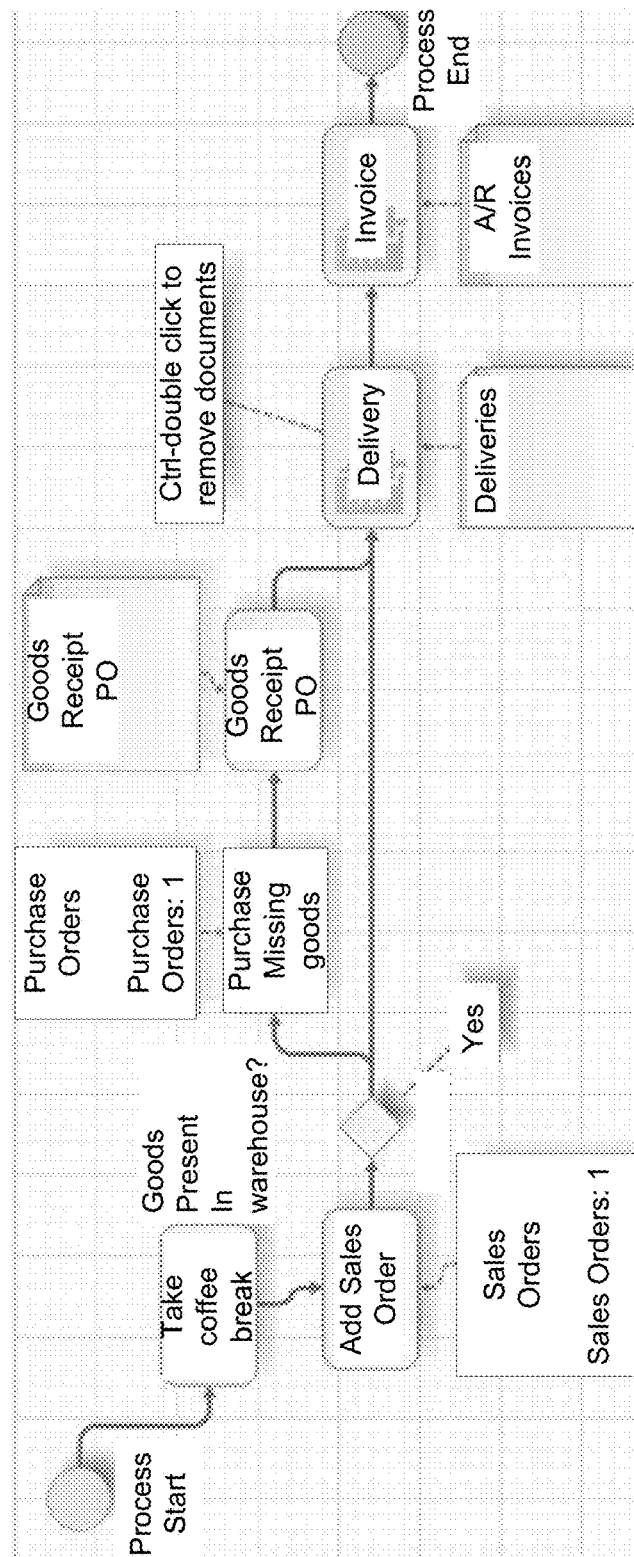
FIG. 3 shows an example of process flow modeling and visualization in connection with a sales scenario.

FIG. 3 provides another example of process flow modeling and visualization, this time in connection with a user who is a sales employee. In particular, the user opens the process checklist instance form and selects appropriate template. Each process uses a predefined template (e.g., in XML format following the BPMN 2.0 industry standard).

FIG. 3 shows the resulting process flow checklist. The user can see all the steps relevant for a specific process. The steps are organized in the time order from the start to the end of the process in the planned chronological order. This example is slightly more complex than that given in FIG. 2, in that the process flow includes a decision point and a corresponding branch.

Example—Employee Training

Process Checklist functionality according to embodiments can also be utilized for training purposes. For example a newly hired employee may need to become familiar with the company's processes as soon as possible, in order to perform his/her new daily tasks in an effective and efficient manner.

During the first days in the new office, the new employee receives the training of a business system (e.g., the SAP BUSINESS ONE software platform available from SAP SE). As part of this training the new employee user becomes familiar with steps to be fulfilled during the daily tasks, in the visual form of the Process Checklist. This allows the user to understand the expected time order of execution of the steps, as well as various document types to be created during the process. The beneficial result is a shorter learning curve of the company's process for the incoming new employee.

Example—BPMN Model/SAP BUSINESS ONE Software

As previously mentioned, some embodiments may reference a specific standard to model business processes. This specific example implements a checklist function utilizing a BPMN model with the SAP BUSINESS ONE platform available from SAP SE of Walldorf, Germany.

Specifically, this particular example of a process checklist functionality visualizes internal company processes in the SAP BUSINESS ONE software, guiding user through the steps to select and create correct documents in the application to cover, e.g., Sales Process. It is possible to create separate processes for different business transactions of the company on different sides, e.g., Sales, Purchase, Production or Service side(s). The generic processes may be covered even currently in the organization of the SAP BUSINESS ONE Main Menu, so their visualization using Process Checklist simplifies the understanding of the SAP Business One functionality.

Visualization of the company's processes in the Process Checklist allows management to view the processes from the higher perspective. This facilitates understanding and recognition of points for simplification in the processes to make them easier to follow. As the processes can be adjusted using BPMN designers, management and employees can adjust the process flow to reflect the reality of performing steps of the visualized process if desired. Moreover, by navigating through instances of the specific process in a Process Checklist, a manager can easily check the "Percentage of Completion" (described below in connection with FIG. 5) of particular deal, and perform various steps if appropriate.

As mentioned above, the processing engine implementing business process checklist functionality in this particular example, comprises several components. A BPMN model and loader implements a subset of BPMN process modeling for describing customer processes. This allows displaying customer defined processes and using extension elements to implement process checklist specific behavior. This module provides a BPMN model which is un-serialized (loaded) from the XML template via class (BPMNSerializer::CBPMNSerializer class).

In this example, the Process Checklist Template (PCT) business object encapsulates loading of the BPMN model template XML and storing it into the database as a binary stream in the OPCT table.

The instance comprises a process checklist instance (PCI) business object which encapsulates un-serializing the model from the template XML, instantiating the BPMN classes and user interaction related to process checklist functionality.

Figure 4A:
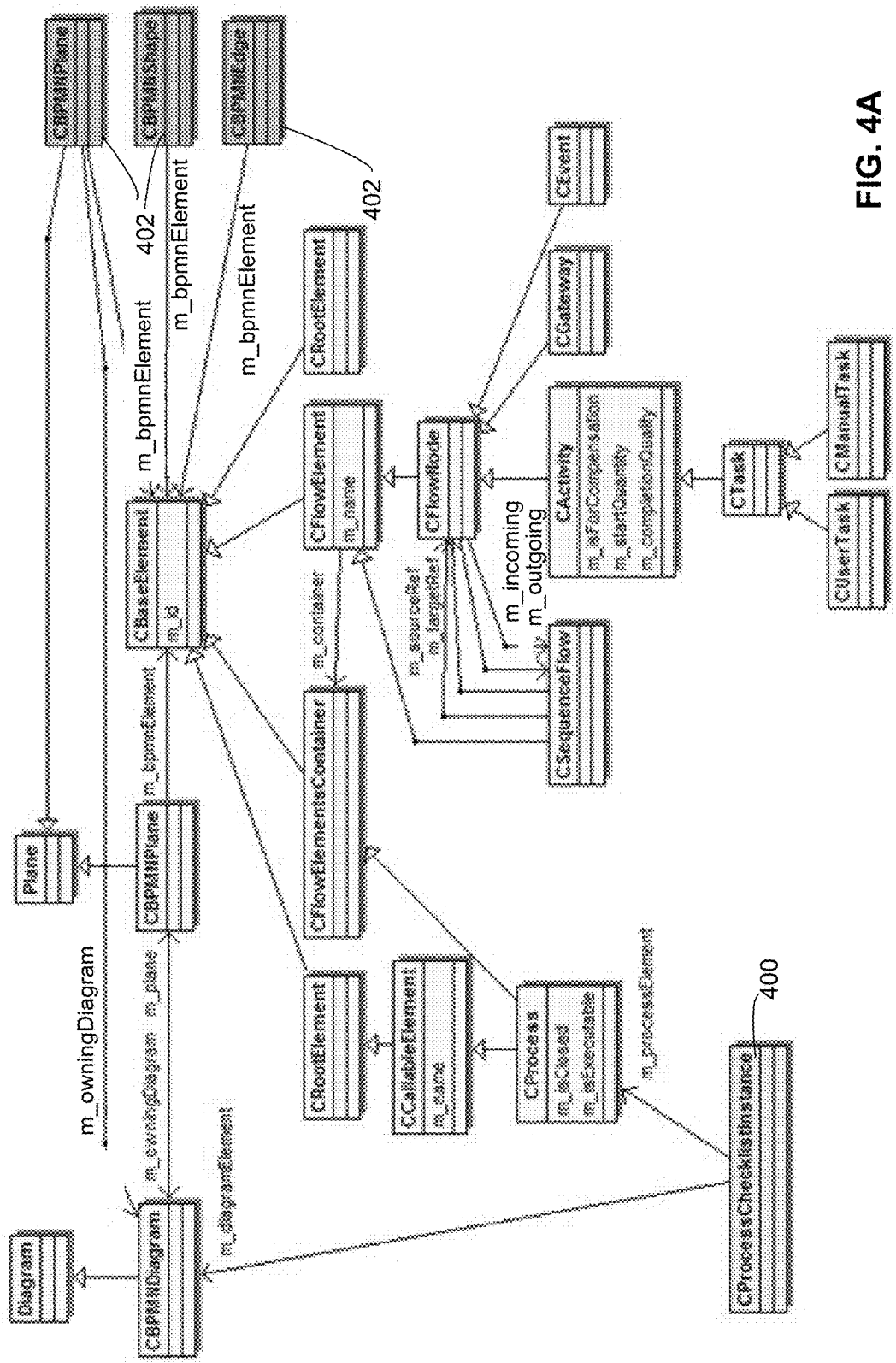
FIGS. 4A-B2 show LinkMap module classes utilized for illustrating the flow diagram according to an example.

LinkMap module classes are used in this example, as now described and further detailed below in connection with FIGS. 4A-B. CProcessChecklistProvider class in the LinkMap namespace implements logic for visualization of the BPMN model via LinkMap item.

This example uses provider for using the instantiated model within the PCI business object and creating LinkMap vertices and edges for every BPMN::DI shape and edge instance, respectively. The example uses BPMN LinkMap vertex which contains reference to the base model element in a similar manner the DI shape and edges link to their base elements.

The example extends LinkMap BPMN classes from the CLMVertex class and adds behavior functionality related to process checklist feature. The example uses CLMVertex- Presenter descendants to provide extra methods that handle BPMN shape vertex drawing.

Further details regarding this particular example are now provided. Specifically, the process flow checklist functionality may be implemented by following that standard model class structure suggested by the normative, with a few exceptions (e.g. simplification of the element extended attributes).

An embodiment may utilize the BPMN 2.0 standard to display customer (partner) defined processes, and rely upon extension elements to implement Process Checklist specific behavior. The BPMN standard itself allows the model extension, in both behavior and visualization.

The BPMN model can be un-serialized (loaded) from the XML template via the following class:
BPMNSerializer::CBPMNSerializer.

The BUSINESS ONE platform available from SAP SE of Walldorf, Germany, may support one or more of the following elements
startEvent
endEvent
userTask
manualTask
dataObject
dataObjectReference
exclusiveGateway
textAnnotation
sequenceFlow
association
bpmndi:BPMNPlane (no need to support swim-lanes)
bpmndi:BPMNShape
bpmndi:BPMNEdge Others could be added to complete the standard coverage. FIG. 4A shows an implemented subset of BPMN model classes. Box 400 shows association of PCI classes to a BPMN model. Boxes 402 show association of LinkMap (visualizer) classes to the BPMN model. All other boxes in FIG. 4A show BPMN model classes implemented based on BPMN standard suggestions.

The Process checklist Template class is now described. In particular, the Process Checklist Template (PCT) Business Object (BO) encapsulates loading of the BPMN 2.0 model template XML (*.bpmn) and storing it into the database. The template may be stored as a binary stream in the OPCT table.

The Process Checklist Instance class is now described. Process Checklist Instance (PCI) BO encapsulates unserializing the model from the template XML, instantiating the BPMN classes and user interaction (actions) related to Process Checklist functionality.

A lifetime of the PCI may be outlined as follows.
1. Process template XML is loaded via PCT class from the database.
2. BPMN model classes—process elements—are instantiated based on unserializing the template XML.
3. LinkMap vertices are instantiated based on DI part of the BPMN model based on unserializing the template XML.
4. Model instance extended elements (user data) are loaded for the particular instance, if they exist; setting parameters for Process Checklist specific extension of BPMN.
5. A user interacts with the LinkMap vertices representing BPMN DI shapes, selects documents, sets task completion, etc.
6. Model instance extended elements (user data) are stored, as the user might have interacted with the instance and changed the data/state/associated documents/etc.

Below is a simplified definition of a main BO table—OPCI:

| Id | Description | db_type |
|---|---|---|
| InstancePk | Instance Primary Key | Integer |
| TemplateFk | Template Foreign Key | Integer |
| InstName | Instance Name | AlphaNumeric |
| InstDesc | Instance Description | AlphaNumeric |
| Creator | Instance Creator | AlphaNumeric |
| Status | Instance Status | AlphaNumeric |
| StartDate | Start Date | Date |
| CloseDate | Close Date | Date |
| CloPrcnt | Closing Percentage | Float |
| Metrics | Completion Metrics | AlphaNumeric |
| Memo | Remarks | Text |
| Attachment | Attachment | Text |
| AtcEntry | Attachment Entry | Integer |

The line table of the BO-PCI1 shown below, stores the extended element information from the XML template, plus the modifications done by the user:

| id | description | db_type |
|---|---|---|
| InstancePk | Instance Primary Key | Integer |
| ObjectPk | ObjectPrimaryKey | Integer |
| BPMNElId | BPMN model Element Id | AlphaNumeric |
| BPMNElDes | BPMN model Element Description | AlphaNumeric |
| ParamType | Parameter Type | AlphaNumeric |
| ParamKey | Parameter Key | AlphaNumeric |
| ParamVal | Parameter Value | AlphaNumeric |

LinkMap classes are now described. The CProcessChecklistProvider class in the LinkMap namespace implements logic for visualization of the BPMN model via the LinkMap item. The provider uses the instantiated model within the PCI business object and creates LinkMap vertices and edges for every BPMN::DI (diagram part of the model) shape and edge instance, respectively. The BPMN LinkMap vertex contains reference to the base model element, in a similar manner the DI shape and edges link to their base elements.

FIGS. 4B1-4B2 show an implemented subset of LinkMap classes to support BPMN Diagram Interchange and user interaction. LinkMap BPMN classes extended from the CLMVertex class add behavior functionality related to Process Checklist feature, e.g. handling of linked Business One documents. CLMVertexPresenter descendants provide extra methods that handle BPMN shape vertex drawing.

Extension Elements are now described. SAP BUSINESS ONE specific (Process Checklist specific) behavior within the BPMN model may be defined via the extension elements, as simple pairs of parameter type and parameter value, plus parameter key (for specific parameter types). As is now described, a number of extension elements are defined for the respective BPMN elements.

One extension element is the process element:
<b1wf:metrics value="CC"/>
This defines Percentage of Completion metrics to be used by default, although the user will be able to display different metrics.

Another extension element is the dataObjectReference element:
<b1wf:type value="GIP"/>
This defines Process Checklist specific behavior to the element (more specific than the plain BPMN standard). For example, the data reference should list associated documents, and double clicking the element should open a choose-from list, etc.

Another extension element defines description displayed as tooltip:
<b1wf:description value="Goods Receipt PO"/>
Another extension element defines an SAP BUSINESS ONE BO type that can be associated with the element:
<b1wf:boType value="20"/>
Another extension element defines a constraint for possible documents associated with the element:
<b1wf:businessPartnerConstraint value="DO_ref_1"/>
The value of the parameter defines another Data Object reference id, whose associated documents are used for constraint evaluation. The filtering condition is "the same business partner".

Another extension element defines a constraint for possible documents associated with the element:
<b1wf:baseTargetConstraint value="DO_ref_1"/>
The value of the parameter defines another Data Object reference id, whose associated documents are used for constraint evaluation. The filtering condition is "documents based internally on one another".

Another element type comprises userTask elements. Thus, the following element defines Process Checklist specific behavior to the element.
<b1wf:type value="GIP"/>
Examples can include that the user task must have a data input Data Object Reference connected, the user task should allow association of documents to its Data Object Reference, the task is counted to Completion percentage, double clicking the element should open a choose-from list, etc.

The following element defines description displayed as a tooltip:
<b1wf:description value="Double click to select GRPO"/>
The following element defines preset string value for the field on the form that is associated with the element's Business Object.
<b1wf:presetGuiValues key="27" value="Recurring Posting"/>
This field should be filled-up with given value when "new" document form is opened from user task Choose-from list.

Yet another element type is manualTask element. The following element:
<b1wf:type value="GIP"/>
defines Process Checklist specific behavior to the element. Examples can include that a manual task is counted to Completion percentage, double clicking the element "Completes" it, etc.

Yet another element type is manualTask element. The following element defines description displayed as tooltip:
<b1wf:description value="Double click to indicate completing the task"/>

Exemplary Features

Process flow checklist visualization and modeling according to embodiments, may include one or more specific features desirable to a user and/or a user's manager.

For example, one such possible feature is generation and display of a process report. In particular a simple list of process instances for a given user, with percentage of completion or estimated count of steps ("tasks ahead"), can be displayed. This affords the user's manager an overview of progress on a project (e.g., the state of all sales in the Sales Department).

Another example of a potentially useful feature, is indication of the Percentage of Completion (PoC) of a project. Thus according to certain embodiments, completion of the process instance (e.g., a percentage progress bar) can be calculated using different metrics, selectable by template creator via specific extension tag.

In order to keep such a progress calculation intuitive and easy to understand by the user, some embodiments may dispense with more complex approaches (e.g., specifying some sort of weighted relevance of paths for branching graphs).

The process can be manually completed/reopened as super user override, without completing its tasks.

The following definitions may be used for progress calculation.

Completed sequence—a directed path in a process graph, connecting only nodes (activities or tasks in BPMN model) with "completed" flag, starting from the start event node A—minimal number of nodes from the start event to the given node B—minimal number of "incomplete" nodes from the given event node to the end event node Several metrics may be used for progress calculation. One is Completed Count (CC).

$$CC = \frac{\text{number of completed nodes}}{\text{number of all nodes}}$$

Figure 5:
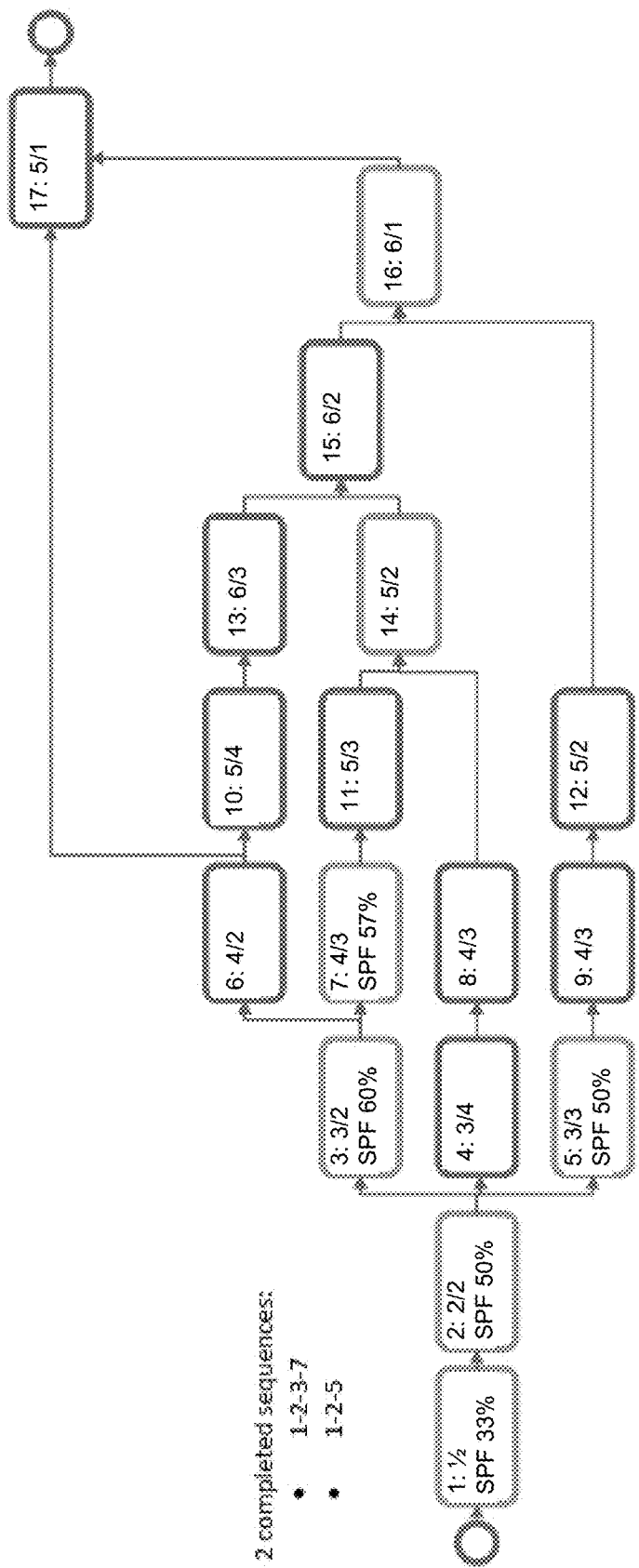
FIG. 5 is a flow chart illustrating a partially completed project.

FIG. 5 is a simplified view of a flow diagram illustrating a partially completed project. A value for the CC PoC metric in FIG. 5 is: CC=6/17=35%. This approach is suited for linear processes without branching.

Another metric for progress calculation is Shortest Path to Finish (SPF)—for all nodes on a completed sequence. Let S be a set of nodes on all completed sequences:

$$SPF = \max_{n \in S} \left\{ \frac{A_n}{A_n + B_n} \right\}$$

For the example shown in FIG. 5, the value for SPF=60%. This metric accounts for completed nodes that are close to the end but not on a completed sequence, if they lie on the shortest path from the completed sequence. Selecting a longer (more "difficult" path) on branch does not affect (increase) the metric if shorter path is still possible (see node id 7).

Another metric potentially useful for progress calculation is Longest Completed Sequence (LCS). Let S be a set of nodes on all completed sequences. Let L be a set of nodes, $L \subset S$, with max (A):

$$LCS = \max_{n \in L} \left\{ \frac{A_n}{A_n + B_n} \right\}$$

For the example shown in FIG. 5, the value for LCS=57%. This metric prefers long chains of completed nodes.

Embodiments of process checklist modeling and visualization according to embodiments may also offer a user comments and/or hints. Process definers and users can take advantage of BPMN Text Annotation element in order to create textual comments and hints to aid users using the given process template.

Certain embodiments may also allow the imposition of process constraints. Such constraints provide a way of blocking addition of new documents that do not match constraints on base document, related business partner, etc. An activity (task) constraint can be defined to prevent skipping of particular steps. Constraints can be visualized or hidden in order not to distort the larger picture.

For example, in one embodiment the BPMN extension element definition may contain the constraint below.

The invoice document assigned to Step 3 is defined with BaseTarget constraint to Sales Order document assigned to Step 1.

Consequently, when Sales Order is assigned to Step 1, the user will only be able to assign Invoice based on this sales order in Step 3.

Some embodiments may provide the feature of semi-automatic addition of referenced documents. This feature utilizes predefined process constraints in order to advise a user of extant documents in database that might be related to the edited process.

Figure 6:
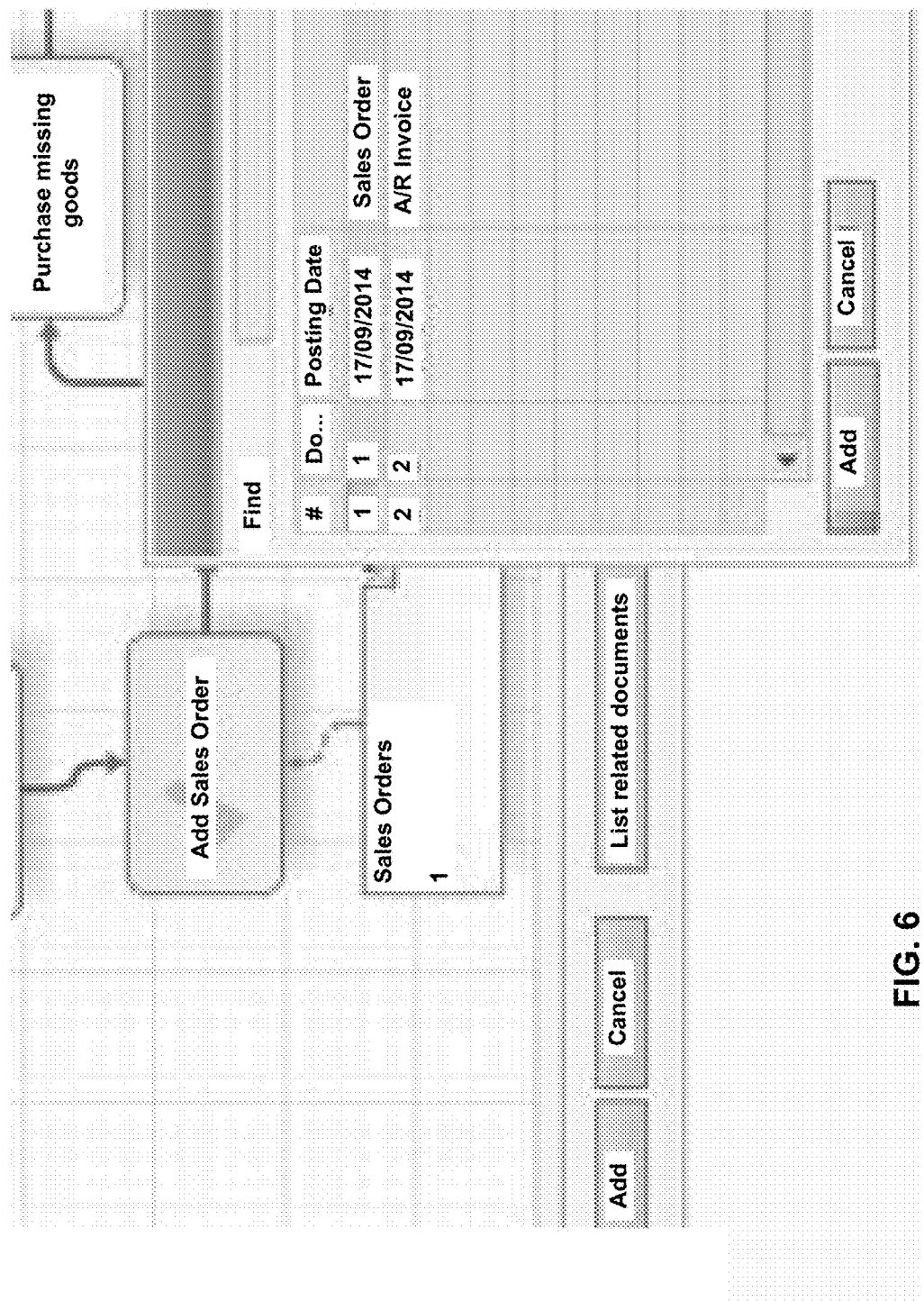
FIG. 6 shows an enlargement of a step of the process flow of FIG. 3 with a suggestion of related documents.

Thus using this feature, a user can run automatic assignment of e.g. target documents to the process, if they are based on the existing document assigned to the process. This is shown in FIG. 6, an enlargement of the screen shot of FIG. 3 with a list of already associated documents and further including suggested related documents (e.g., an A/R invoice).

Other types of semi-automatic behavior may be implemented according to embodiments. For example, using standard SAP BUSINESS ONE activities, the user can reference an Activity step in a Process Checklist instance, thus "delegating" some activity. Upon completion of the activity, the process step can indicate possibility of completing the process task.

Another possible feature that may be offered by particular embodiments, is the assignment of an "owner" to a particular process. Thus a user can assign an owner to a process checklist instance. This assignment may be done per customer, for example, or per type of flow via activities on header of process instance.

Figure 7:
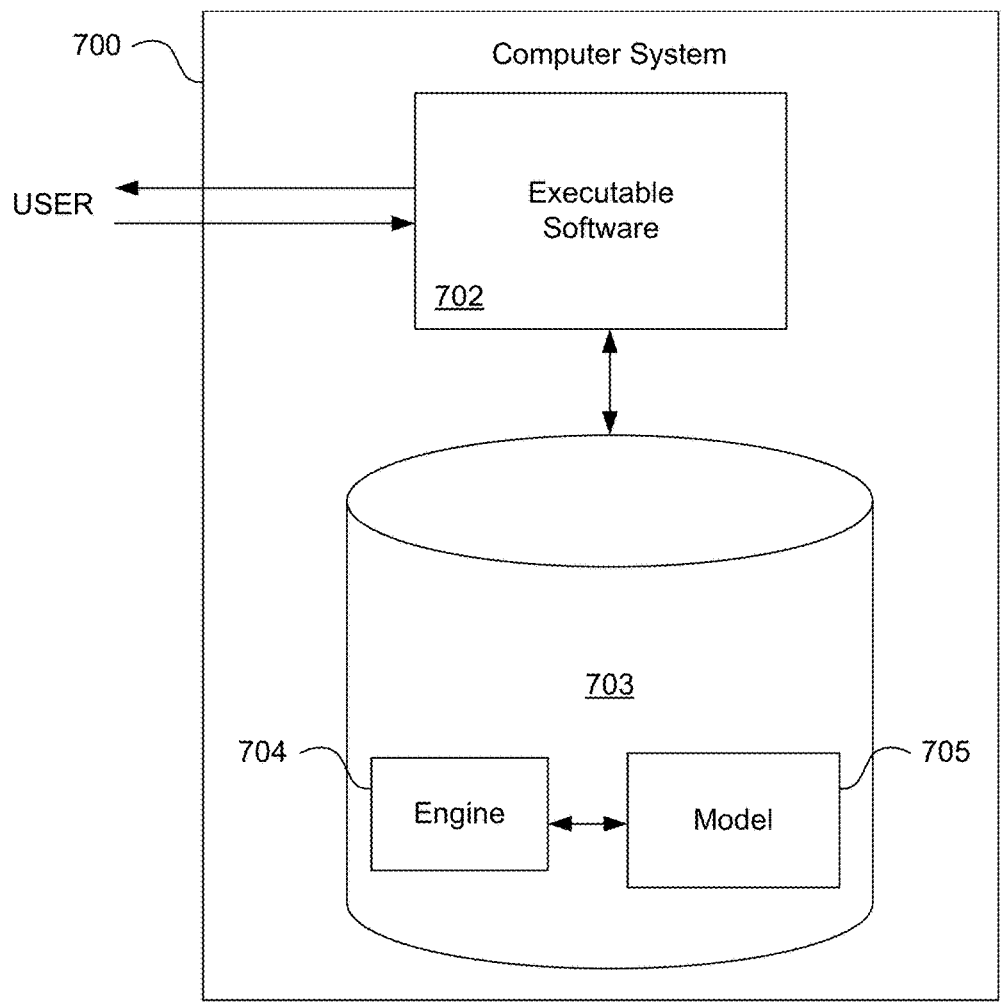
FIG. 7 illustrates hardware of a special purpose computing machine configured to provide a checklist function integrated with a process flow model according to an embodiment.

FIG. 7 illustrates hardware of a special purpose computing machine configured to provide a process flow checklist function according to an embodiment. In particular, computer system 700 comprises a processor 702 that is in electronic communication with a non-transitory computer-readable storage medium 703. This computer-readable storage medium has stored thereon code 705 corresponding to a process flow model. Code 704 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 7, the engine is shown as being part of the database. Such an embodiment can correspond to applications where processing is performed by a powerful engine available as part of an in-memory database (e.g., the HANA in-memory database available from SAP SE of Walldorf, Germany). However this is not required and in certain embodiments the engine may be implemented in other ways, for example as part of an application layer overlying a database layer.

Figure 8:
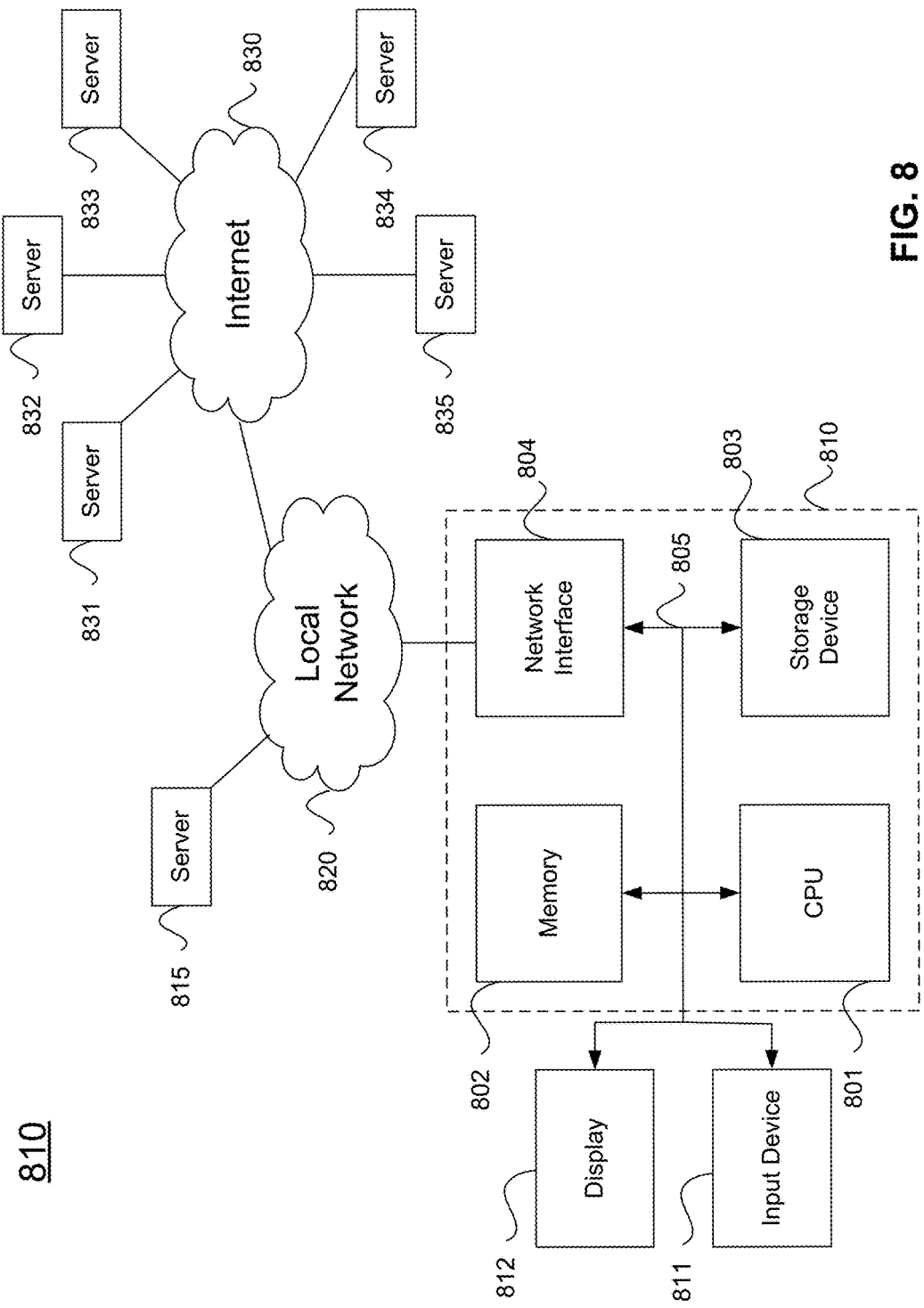
FIG. 8 illustrates an example of a computer system.

An example computer system 810 is illustrated in FIG. 8. Computer system 810 includes a bus 805 or other communication mechanism for communicating information, and a processor 801 coupled with bus 805 for processing information. Computer system 510 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments along with examples of how aspects may be implemented. The above examples and embodiments should not be deemed to be the only embodiments, and are presented to illustrate the flexibility and potential benefits as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   an in-memory database engine generating from a process flow model stored in an in-memory database, a first process flow step linked to a first document stored in the in-memory database;
   the in-memory database engine generating from the process flow model, a second process flow step linked to a second document stored in the in-memory database;
   the in-memory database engine referencing the process flow model and the first process flow step to generate a decision point leading to a branch;
   the in-memory database engine displaying a process flow checklist including the first process flow step, the second process flow step, the decision point, and the branch;
   the in-memory database engine displaying the first document in response to a first input to the process flow checklist;
   the in-memory database engine updating the process flow checklist in response to an input indicating completion of the first process flow step;
   based upon the input, the in-memory database engine generating a first percentage of completion metric according to a first equation;
   based upon the input, the in-memory database engine generating a second percentage of completion metric according to a second equation different from the first equation, wherein the first percentage of completion metric comprises Shortest Path to Finish (SPF), and the second percentage of completion metric comprises Longest Completed Sequence (LCS);
   the in-memory database engine displaying the first percentage of completion metric; and
   the in-memory database engine displaying the second percentage of completion metric.

2. A method as in claim 1 further comprising the in-memory database engine creating the process flow model from an input template.

3. A method as in claim 2 wherein the process flow model is created according to the Business Process Model Notation (BPMN) 2.0 standard.

4. A method as in claim 1 further comprising the in-memory database engine communicating a process report to other than a user.

5. A method as in claim 1 further comprising the in-memory database engine suggesting a second document relevant to the first step.

6. A method as in claim 1 wherein the process flow model further includes a constraint.

7. A method as in claim 1 further comprising the in-memory database engine assigning an owner to the process flow checklist.

8. A non-transitory computer readable storage medium embodying a computer program for performing a method, said method comprising:
   an in-memory database engine generating from a process flow model stored in an in-memory database, a first process flow step linked to a first document stored in the in-memory database;
   the in-memory database engine generating from the process flow model, a second process flow step linked to a second document stored in the in-memory database;
   the in-memory database engine referencing the process flow model and the first process flow step to generate a decision point leading to a branch;
   the in-memory database engine displaying a process flow checklist including the first process flow step, the second process flow step, the decision point, and the branch;
   the in-memory database engine displaying the first document in response to a first input to the process flow checklist;
   the in-memory database engine suggesting a second document relevant to the first process flow step;
   the in-memory database engine updating the process flow checklist in response to an input indicating completion of the first process flow step;
   based upon the input, the in-memory database engine generating a first percentage of completion metric according to a first equation;
   based upon the input, the in-memory database engine generating a second percentage of completion metric according to a second equation different from the first equation, wherein the first percentage of completion metric comprises Shortest Path to Finish (SPF), and the second percentage of completion metric comprises Longest Completed Sequence (LCS);
   the in-memory database engine displaying the first percentage of completion metric; and
   the in-memory database engine displaying the second percentage of completion metric.

9. A non-transitory computer readable storage medium as in claim 8 wherein the method further comprises the in-memory database engine creating the process flow model from an input template.

10. A non-transitory computer readable storage medium as in claim 9 wherein the process flow model is created according to the Business Process Model Notation (BPMN) 2.0 standard.

11. A non-transitory computer readable storage medium as in claim 8 wherein the method further comprises the in-memory database engine communicating a process report to other than a user.

12. A non-transitory computer readable storage medium as in claim 8 wherein the process flow model further comprises a constraint.

13. A computer system comprising:
   one or more processors;
   a software program, executable on said computer system, the software program configured to cause an in-memory database engine to:
   generate from a process flow model stored in an in-memory database, a first process flow step linked to a first document stored in the in-memory database;
   generate from the process flow model, a second process flow step linked to a second document stored in the in-memory database;
   reference the process flow model and the first process flow step to generate a decision point leading to a branch;
   display a process flow checklist including the first process flow step, the second process flow step, the decision point, and the branch;
   display the first document in response to a first input to the process flow checklist;
   update the process flow checklist in response to an input indicating completion of the first process flow step;
   generate a first percentage of completion metric comprising Shortest Path to Finish (SPF) according to a first equation; and generate a second percentage of completion metric comprising Longest Completed Sequence (LCS) according to a second equation different from the first equation.

14. A computer system as in claim 13 wherein the in-memory database engine is further caused to create the process flow model from an input template.

15. A computer system as in claim 14 wherein the process flow model is created according to the Business Process Model Notation (BPMN) 2.0 standard.

16. A computer system as in claim 13 wherein the in-memory database engine is further caused to assign an owner to the process flow checklist.

17. A computer system as in claim 13 wherein the in-memory database engine is further caused to suggest a second document relevant to the first process flow step.

* * * * *